United States Patent [19]
Mermelstein et al.

[11] 4,074,658
[45] Feb. 21, 1978

[54] TURKEY LOADER

[76] Inventors: Shmuel Mermelstein, 63-61 Yellowstone Blvd., Forrest Hills, N.Y. 11375; Nathan Klugmann, Kibbutz Nachshon, Israel

[21] Appl. No.: 721,978

[22] Filed: Sept. 10, 1976

[51] Int. Cl.² ............................................. A01K 29/00
[52] U.S. Cl. ..................................................... 119/82
[58] Field of Search ................... 119/82; 198/39, 165; 214/512

[56] References Cited

U.S. PATENT DOCUMENTS

| | | | |
|---|---|---|---|
| 3,253,577 | 5/1966 | Lund | 119/82 |
| 3,420,211 | 1/1969 | Hartrickson | 119/82 |
| 3,602,198 | 8/1971 | Tackett et al. | 119/82 |

*Primary Examiner*—Hugh R. Chamblee
*Attorney, Agent, or Firm*—Karl F. Ross

[57] ABSTRACT

A turkey loader for transferring live birds of a flock to cages, e.g. on a van or truck for carrying same to market, comprises a conveyor belt mounted upon the elevatable member of a forklift vehicle and provided at one end with a raisable and lowerable gate through which the turkeys are admitted onto the conveyor belt. At the other end the structure is formed with a door which can be raised to permit egress of the turkeys as they enter their cages. The structure is further provided with a suspended platform upon which an operator can stand to insure proper movement of the turkeys into the respective cages and from which the operator can open and close the cage doors. The platform can be provided with hydraulic controls necessary to align the discharge end of the conveyor with the respective cages.

6 Claims, 6 Drawing Figures

TURKEY LOADER

FIELD OF THE INVENTION

The present invention relates to a turkey loader and, more particularly, to an apparatus for transferring turkeys from an enclosure in which they are received as a flock, to individual cages, e.g. on a transport vehicle.

BACKGROUND OF THE INVENTION

In the husbandry of turkeys and other large birds, it is frequently necessary to transfer the birds to cages, e.g. for transport to market or simply to move the birds from one place to another. A typical vehicle for the transportation of turkeys comprises a multiplicity of cages stacked upon one another and disposed in rows along the back of a transporter or truck. The turkeys, generally raised in flocks, must be transferred in given number to each of the cages of the truck in succession.

The transfer of turkeys is usually a cumbersome, tiring and difficult process. If the transfer is to be effected by hand, each individual bird must be caught and carried to the cage opening and pushed inside. This is a particularly onerous task since turkeys can be heavy and the procedure is exceedingly tiresome.

As turkey-raising farms have increased in size, there has been considerable effort expended in improving the technique whereby turkeys are deposited in cages or other transportable enclosures for transfer to market or to a turkey processing station. In general such devices have comprised a conveyor belt which is tilted upwardly so that the upper end terminates at the cage while the other end terminates at an enclosure for the turkeys.

Such a device has considerable advantages over hand loading but has not proved to be entirely satisfactory.

For example, it is not always sufficiently mobile to allow transfer of turkeys, especially when the vehicle cannot be properly positioned with respect to the discharge end of the conveyor.

Furthermore, long conveyors of the type which have been found necessary heretofore are exceedingly expensive and difficult to operate efficiently especially when large numbers of turkeys are to be transferred to different locations or to different vehicles. Finally, the conventional conveyors for the transfer of turkeys and other birds, raised upon a farm, are not economically feasible for small farms in which the loader is only used for a brief period during the year.

For these reasons considerable effort has been expended to improve upon turkey-loading techniques even though the aforementioned conveyor has received wide-spread acceptance at least upon larger farms.

OBJECTS OF THE INVENTION

It is the principal object of the present invention to provide an improved turkey loader in which the aforementioned disadvantages are obviated.

Another object of this invention is to provide a turkey loading apparatus which is of simple and low cost construction, is far more versatile than existing turkey loaders in that the discharge of turkeys can be changed rapidly with respect to direction, and which possesses the necessary controllability and versatility to transfer large numbers of turkeys with a minimum of labor expenditure and at ease.

Still a further object of this invention is to provide a turkey loader which can be used with birds of all sizes and constitutes a labor-saving device by comparison with earlier turkey-transferring techniques.

Finally, it is an object of the invention to provide a turkey loading apparatus which will be highly effective for smaller farms as well as for large farming installations.

SUMMARY OF THE INVENTION

These objects, and others which will become apparent hereinafter, are attained, in accordance with the present invention, in an apparatus for transferring birds of a flock from an enclosure to respective cages in a cage stack, e.g. upon a vehicle, which comprises an elevatable and lowerable horizontal conveyor belt and a support structure therefore, the support structure being mounted upon the vertically shiftable member of a forklift device.

The present invention utilizes the fact that practically every farm, large and small, is equipped with a tractor having a forklift attachment for the handling of bales, turkey cages and the like. According to the invention, this tractor is provided with a structure which is formed with a conveyor belt having an entry end and an egress end. In principle, therefore, the use of a tilted conveyor, reaching from the enclosure to the cage, is eliminated.

In accordance with this aspect of the invention, the conveyor is horizontal and is lowered to receive the turkeys at its entry end and is thereafter raised to align its egress end with a cage into which the turkeys are to be discharged.

According to an important feature of the invention, the support structure for the conveyor is also provided with a depending platform on which the operator of the device can stand or be seated. This platform is provided adjacent the egress or discharge end and serves to support the operator and the control means for the device, namely, the means for hydraulically shifting the conveyor assembly horizontally and vertically to position the egress of discharge end in line with the opening to the cage. Since the cage is provided with a closable door, the operator can also be the one who opens and closes this door and hence is able to prepare the cage to receive the turkeys or prevent the escape of turkeys once they have been deposited in the case.

According to still another feature of the invention, the entry end of the conveyor structure is provided with a swingable gate which can be raised, e.g. manually or automatically, when the conveyor is lowered to align it with a ramp or other guide system whereby the turkeys are guided onto the conveyor. Without materially increasing the cost of the system of the present invention, the ramp may be formed by a drivable conveyor of relatively short size and hence of much smaller cost than the relative long conveyors used heretofore for direct transfer of the birds from the enclosure to the cases.

Still another feature of the invention resides in providing a swingable door member at the discharge or egress end of the conveyor, this door being operated by the individual controlling the unit and serving to retain the turkeys on the conveyor belt once the conveyor belt has stopped moving and all of the turkeys have been deposited thereon.

Advantageously, this latter door structure forms a guide member inclined downwardly in the direction of discharge of the conveyor. Of course, it is possible to load and unload the turkeys from one end, thereby using only one swingable door, the other end of the structure being provided with a fixed door to prevent the turkeys from falling off this end of the conveyor.

Advantageously, the conveyor is operated by a hydraulic motor, and the conveyor-carrying structure is mounted upon the forklift with freedom of horizontal movement transverse to the direction of displacement of the conveyor. Further means may be provided to control the vertical position of the conveyor, all of these latter means being hydraulically operated by control valves mounted upon the platform.

The principal advantage of the present system is its considerable simplicity over conventional arrangements as further in the fact that only a single operator is required once the forklift is in position. By operating the controls on the platform, the operator can successively line up the discharge end of the conveyor with the openings communicating with the cages.

The system also has the advantage that it obviates the need to lift relatively heavy cages containing birds and thus eliminates a significant disadvantage of conventional systems in which the birds are caught, introduced into cages and the cages are stacked upon a vehicle. Naturally the arrangement also eliminates any need for hand-catching, tieing or movement of the birds.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
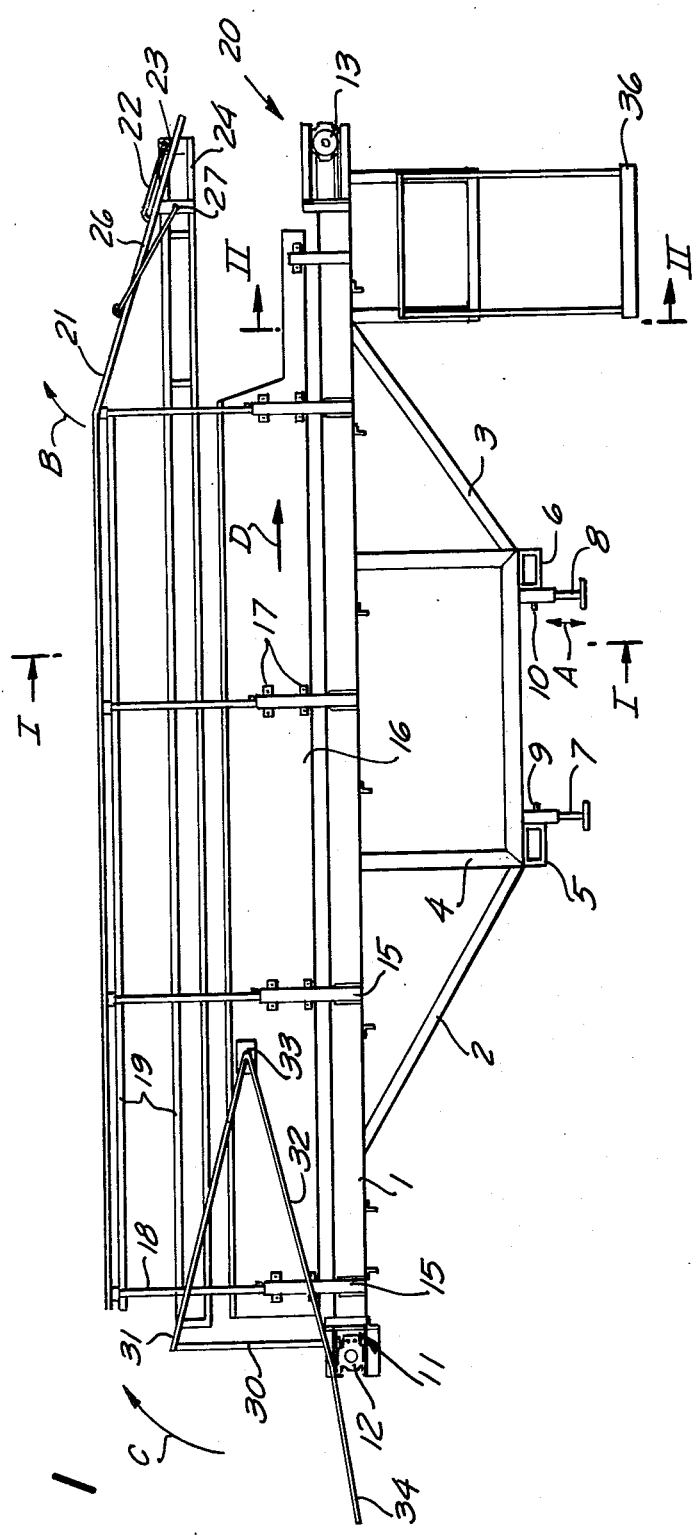
FIG. 1 is a diagrammatic side-elevational view of a turkey loader according to the present invention.

In FIG. 1 of the drawing, we have shown a turkey loader according to the present invention which comprises a support 1 having a truss-like structure comprising a pair of struts 2, 3, on each side of the device, only one of the struts being illustrated in FIG. 1.

The struts 2, 3 are anchored to a frame 4 having a pair of sockets 5, 6 adapted to receive the fork members of a forklift truck. Pedestals 7, 8 (two on each side of the device) serve to support the unit on the ground when the latter is lowered. Supports 7 and 8 can be vertically adjusted in the direction of the arrow A via setscrews 9 and 10. The support 1 is provided with a conveyor belt generally represented at 11 and having end rollers 12, 13, which may be driven by a hydraulic motor 14 illustrated in FIG. 6.

The support 1 also carries a plurality of uprights 15 to which a pair of relatively low sidewalls 16 are anchored via brackets 17. The tubular uprights 15 also receive posts 18 which carry horizontal members 19 forming a lateral gate along each side of the conveyor.

At the discharge end 20 of the device, there is provided a door 21 which is formed with a hoop 22 receiving a pin 23 carried by rails 24 of the gate members 19 of the device. Separate pins can be confined to each of the opposite edges thereof. The door 21 is, moreover, articulated at 25 to a guide rod 26 which is pivotally mounted at 27 to the rails 24. Consequently when the door 21 is swung in the direction of arrow B, it can assume a vertical position as shown, for example, in broken lines in FIG. 5.

At the intake end of the conveyor, there is provided a further door 30 which is formed with a pair of connecting rods 31, 32 hinged at 33 to the sidewalls 16. It should be noted that for all of the structure described with respect to FIG. 1, a similar structure exists on the opposite side of the device.

Rod 32 is prolonged at 34 to form a system for automatically opening the door 30 by swinging it about the pivot 33 in the direction of arrow C. This is accomplished as has been illustrated in FIG. 5, by lowering the conveyor until the prolonged portion 34 of the rod engages the top of an intermediate conveyor 50. The latter will be described as to function and structure subsequently.

Figure 3:
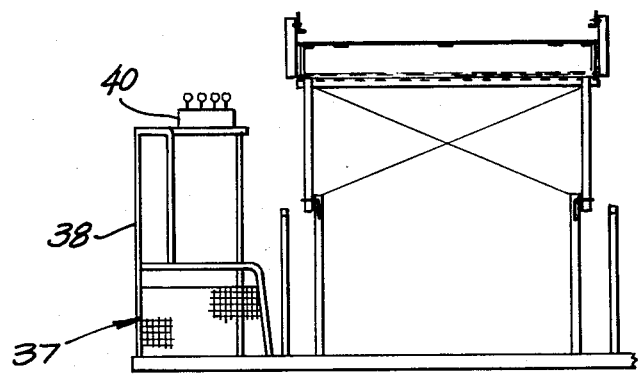
FIG. 3 is a fragmentary end view of the platform structure forming part of the conveyor of the present invention.

The structure 1, (FIG. 1) also carries a platform 36 provided with two baskets 37, one on each side of the conveyor, of which only one has been illustrated in FIG. 3. The baskets are formed from pipe or rod 38 and can accomodate an operator. The basket 37 may be provided with a control valve arrangement such as has been diagrammatically illustrated at 40 in FIG. 3 and is described in greater detail in connection with FIG. 6.

The platform 36 and the basket 37 are located at the discharge end 20 of the turkey loading device.

Figure 2:
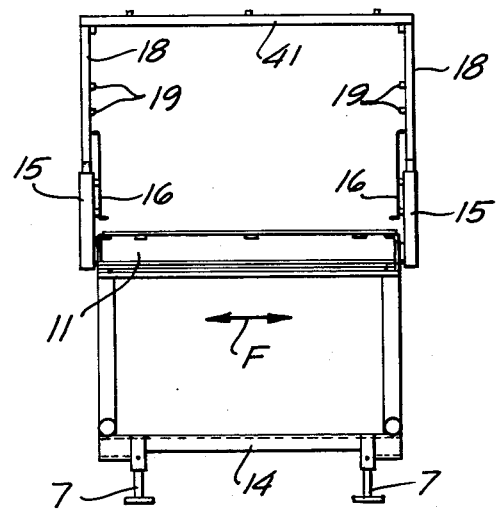
FIG. 2 is an end view thereof, partly broken away.

The rails 19 may be connected by transverse members 41 (see FIG. 2).

Figure 4:
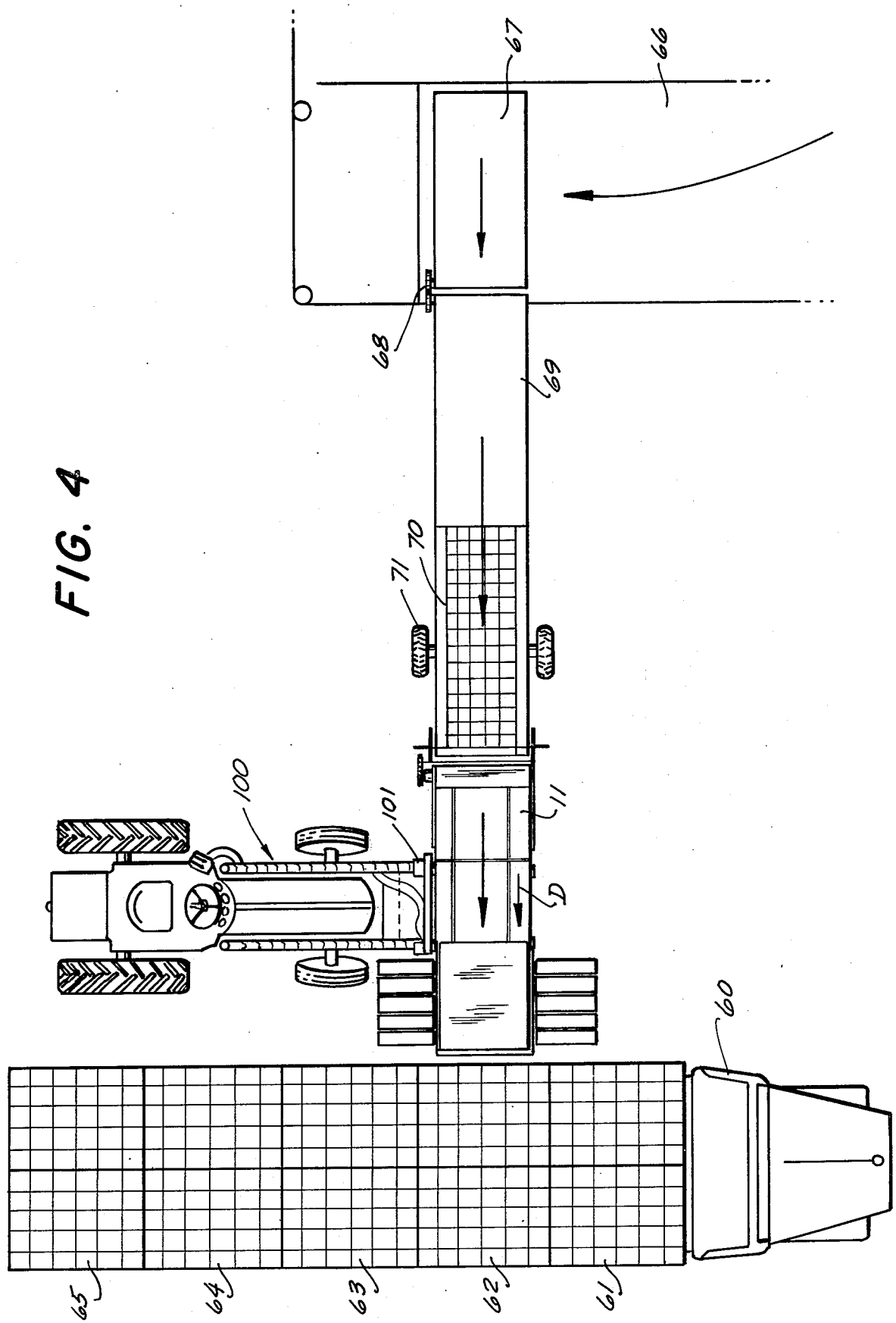
FIG. 4 is a diagrammatic plan view illustrating the operation of the device according to the invention.

In FIG. 4, we have shown the principle of operation of the system of the present invention.

Figure 5:
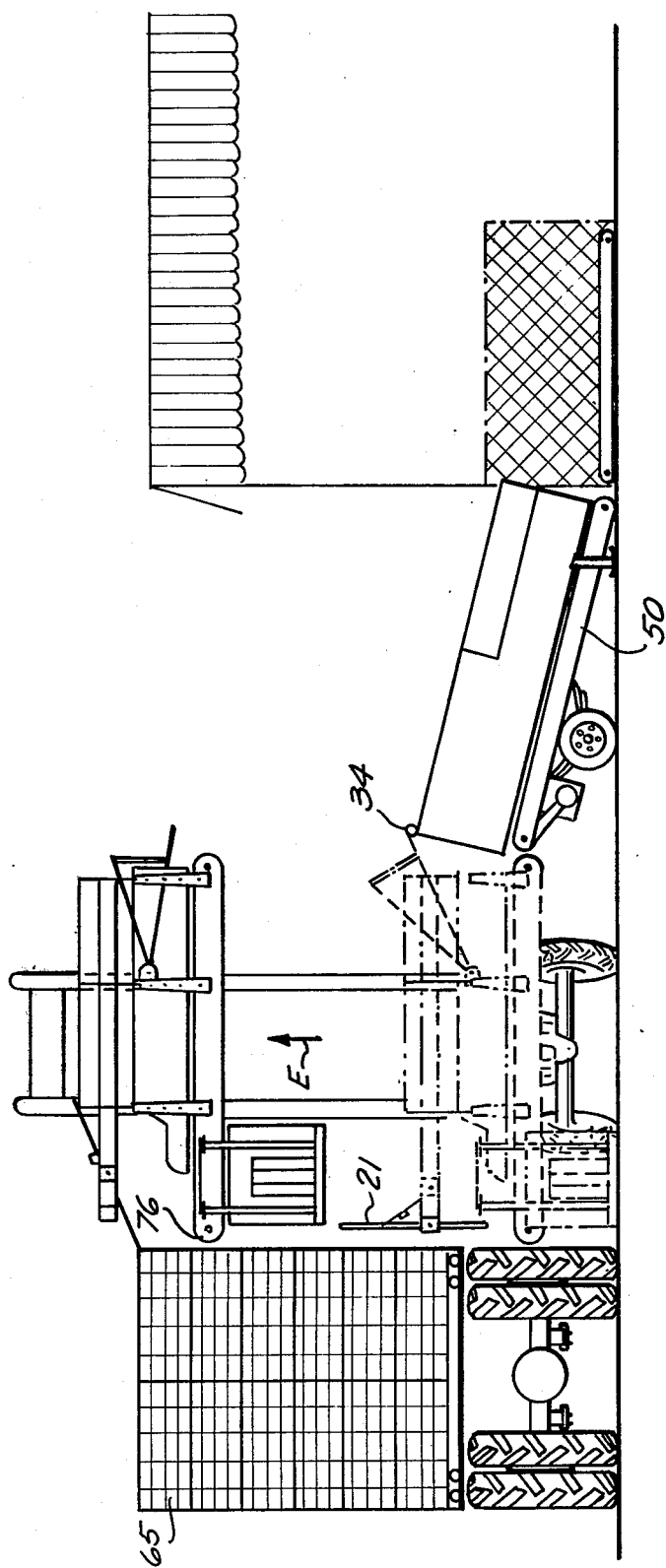
FIG. 5 is a side-elevational view of a portion of the latter system.

Assume that a flock of turkeys is to be loaded onto a vehicle 60 provided with individual cages 61, 62, 63, 64, 65 stacked in six tiers as best seen in FIG. 5, each of the cases having a door (not shown) on one side of the vehicle.

The turkeys are directed along a runway 66 onto a conveyor platform 67 which can be driven as represented at 68 from a further conveyor platform 69. They then pass onto an upwardly inclined ramp 70 which may also be hydraulically driven, e.g. by a motor 71 (FIG. 6), controlled by the hydraulic system at the platform of the loader. The conveyor 70 is of conventional construction and may be provided with wheels 71 to allow it to be put into place with ease. The conveyor 11 is aligned with the inclined platform 70 and the door 34 is opened as the platform is lowered (see FIG. 5). The conveyor 11 is then driven in the direction of arrows D (FIG. 4), the door 21 being meanwhile closed.

When the requisite number of turkeys for a particular cage or group of cages has been collected upon the conveyor 11, the further driving movement of the conveyor 11 is terminated and the conveyor is raised (arrow E in FIG. 5), e.g. by the conventional hydraulic cylinder of the forklift tractor, the hydraulic cylinder being represented at 75.

The discharge edge 76 of the conveyor is aligned with the opening in the case, the door of which has been opened via an operator standing in one of the baskets on the platform. The operator then drives the conveyor 11 again in the direction of arrow D to carry the turkeys into the cage. The operator can ensure that all the turkeys enter the cage in a uniform and convenient manner.

In its open position, the door 21 is inclined downwardly and forwardly in the direction of arrow D (see FIG. 1) to cause the turkeys to pull their heads downwardly and thereby enter the generally short opening of the cage with ease.

To facilitate alignment of the discharge edge of the conveyor with the cage opening, the entire conveyor assembly can be mounted on the support structure 1 so as to be horizontally shiftable (arrow F in FIG. 2), e.g. via a hydraulic cylinder 80.

Figure 6:
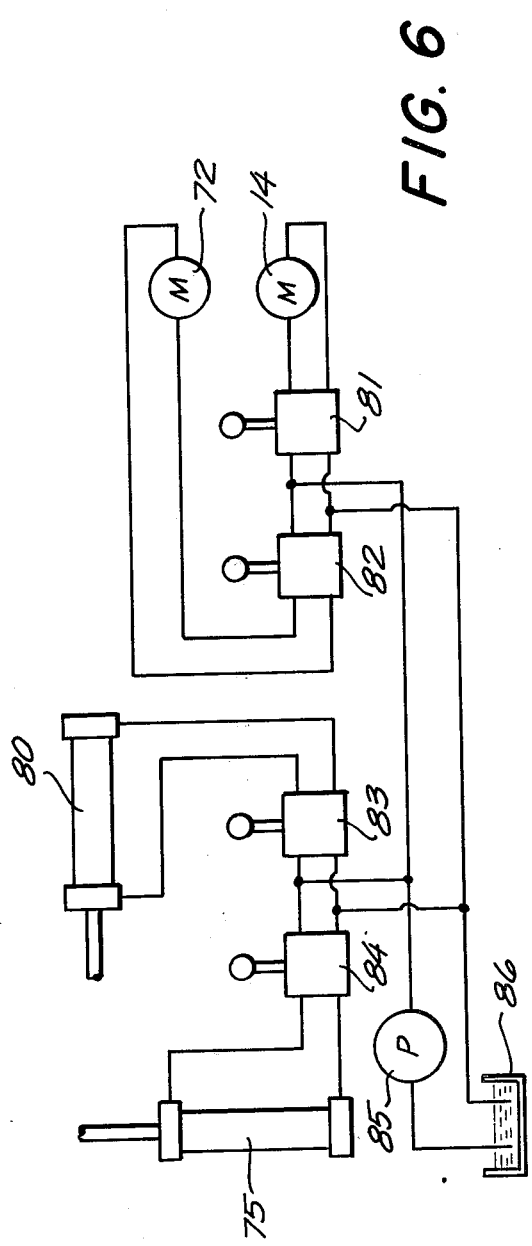
FIG. 6 is a hydraulic diagram illustrating controls which are carried on the platform and have a coordinate with the various elements of the device.

The control system has been diagrammatically illustrated in FIG. 6 and comprises four valves 81, 82, 83 and 84, each connected to a hydraulic pump 85 and a reservoir 86, the latter forming part of the hydraulic system of the forklift tractor which is represented diagrammatically at 100 in FIG. 4. The valve 81 is connected to the hydraulic motor 14 driving the conveyor 11. The valve 82 is connected to the hydraulic motor 72 for driving the ramp 70. The hydraulic valve 83 is connected to the double-acting cylinder 80 for horizontally shifting the conveyor in the direction of arrow E. The valve 84 is connected to the double-acting cylinder 75 which raises and lowers the carriage of the forklift. The forklift structure is represented diagrammatically at 101 and can be any conventional forklift arrangement.

When loding on one side of the truck 60 is completed, the tractor, after the conveyor 11 has been loaded with turkeys, can simply drive around to the opposite side to discharge the turkeys. A repositioning of the truck and of the entire ramp arrangement is therefore unnecessary with the system of the present invention.

We claim:

1. A loader for birds, particularly for the transfer of birds from a flock to a cage, comprising:
    a support structure;
    means on said support structure engageable by a forklift for elevating and displacing said support structure;
    a generally horizontal conveyor on said support structure, said conveyor being flanked by a pair of guides and having an entry end and a discharge end;
    an inlet gate at said entry end displaceable to permit birds to pass onto said conveyor;
    a discharge gate at said discharge end shiftable to permit birds to pass from said conveyor;
    a platform suspended from said structure at said discharge end adapted to accommodate an operator for guiding said birds off the discharge end of said conveyor; and means including
    a hydraulic system removably connected with said support structure for positioning said conveyor and including control means at said platform for operation by the operator of said hydraulic system for vertically moving said support structure, said discharge gate being mounted upon said structure so as to swing into an open position in which it is inclined downwardly and forwardly in the direction of movement of said conveyor to discharge said birds therefrom and said inlet gate being closed upon vertical movement of said support structure.

2. The loader defined in claim 1 wherein said entry gate is swingably mounted on said support structure and is provided with means for automatically elevating said entry cage into an open position upon lowering of said conveyor to a loading position.

3. The loader defined in claim 2 wherein said platform is provided with a pair of baskets each adapted to support a respective operator, said baskets straddling said conveyor.

4. The loader defined in claim 3 wherein said support structure comprises a pair of lateral walls flanking said conveyor and a pair of lateral fixed gates above said walls, said entry gate being swingably mounted on said support structure and said discharge gate being guided on said support structure between its open position and a closed position where it extends vertically.

5. The loader defined in claim 4 wherein said support structure is provided with a depending truss having sockets adapted to receive fork members of a forklift vehicle.

6. The loader defined in claim 5 wherein said control means includes means adapted to operate a conveyor ramp for feeding birds onto said conveyor.

* * * * *